United States Patent

Braat

(10) Patent No.: US 6,788,644 B1
(45) Date of Patent: Sep. 7, 2004

(54) DEVUCE AND METHOD FOR FORMING A FOCUS ERROR SIGNAL BASED ON OHASE DIFFERENCE BETWEEN CORRESPONDING PARTS OF DETECTOR SIGNALS

(75) Inventor: Josephus J. M. Braat, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/332,239

(22) Filed: Jun. 14, 1999

(30) Foreign Application Priority Data

Jun. 15, 1998 (EP) .......................................... 98201986

(51) Int. Cl.$^7$ ................................................ G11B 7/24
(52) U.S. Cl. ............................... 369/275.4; 369/275.1; 369/13.54
(58) Field of Search ........................... 369/44.23, 44.36, 369/124.13, 112.26, 44.29, 44.41, 124.14, 124.02, 44.37, 44.24, 44.11, 44.32, 124.06, 47.28, 275.3, 116, 111, 13.54, 275.4, 275.1, 59.2

(56) References Cited

U.S. PATENT DOCUMENTS

| | | | |
|---|---|---|---|
| 4,010,317 A | | 3/1977 | Bouwhuis .................... 358/127 |
| 4,051,527 A | | 9/1977 | Braat ......................... 358/128 |
| 4,057,833 A | | 11/1977 | Braat ......................... 358/128 |
| 4,419,750 A | * | 12/1983 | Howe .......................... 369/111 |
| 4,674,081 A | * | 6/1987 | Gerard et al. ............. 369/275.3 |
| 4,785,441 A | * | 11/1988 | Tanaka et al. ............ 369/44.23 |
| 4,998,235 A | * | 3/1991 | Ishibashi et al. ......... 369/44.36 |
| 5,132,948 A | * | 7/1992 | Ishibashi .................. 250/201.5 |
| 5,195,072 A | * | 3/1993 | Fukui et al. ............ 369/112.26 |
| 5,430,704 A | * | 7/1995 | Maeda ........................ 369/120 |
| 5,652,746 A | * | 7/1997 | Heiman .................. 369/124.02 |
| 5,654,953 A | * | 8/1997 | Yoshida et al. .......... 369/275.1 |
| 5,982,738 A | * | 11/1999 | Miyamoto et al. ....... 369/275.3 |
| 5,986,999 A | * | 11/1999 | Takahashi .............. 369/124.13 |

* cited by examiner

Primary Examiner—William Korzuch
Assistant Examiner—Kim-Kwok Chu

(57) ABSTRACT

A device scans an optical record carrier having optically detectable marks along a track. The device includes a radiation source for emitting a radiation beam, an objective system for guiding the radiation beam to the record carrier, and a radiation-sensitive detection system for receiving radiation from the record carrier. The detection system includes at least two detectors on both sides of a dividing line. Each detector has an output for providing a detector signal. An electronic circuit forms a focus error signal from the detector signals. The electronic circuit determines a time or phase difference between corresponding parts of the detector signals relating to passage of the radiation beam over patterns of the marks having a spatial frequency in a first range and in a different, second range, and forms a focus error signal in dependence on the time or phase difference.

Figure 1:
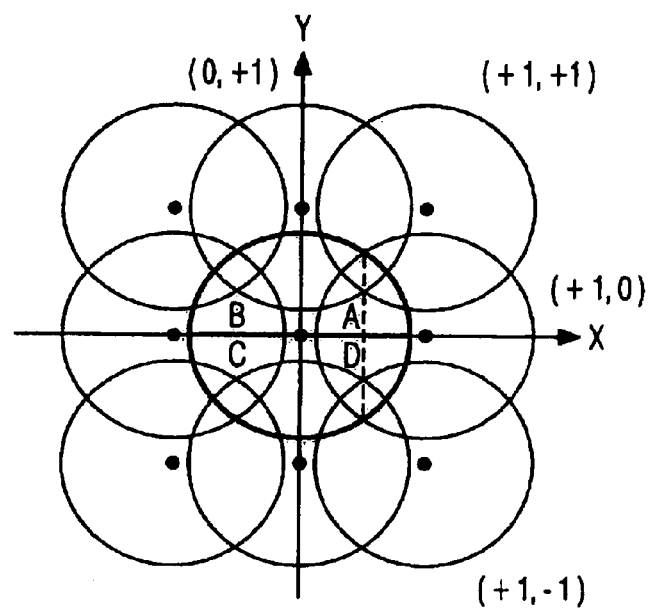

3 Claims, 4 Drawing Sheets

# DEVUCE AND METHOD FOR FORMING A FOCUS ERROR SIGNAL BASED ON OHASE DIFFERENCE BETWEEN CORRESPONDING PARTS OF DETECTOR SIGNALS

FIELD OF INVENTION

The invention relates to a device for scanning an optical record carrier comprising optically detectable marks along a track, which device comprises a radiation source for emitting a radiation beam, an objective system for guiding the radiation beam to the record carrier, and a radiation-sensitive detection system for receiving radiation from the record carrier, the detection system comprising at least two detectors on both sides of a dividing line, each detector having an output for providing a detector signal, and an electronic circuit for forming a focus error signal from the detector signals.

BACKGROUND AND SUMMARY OF THE INVENTION

A device according to the preamble is known from U.S. Pat. No. 4,010,317 (PHN 6 224). The device comprises an objective lens for focusing the radiation beam onto an information layer of the record carrier in which information is stored in the form of marks. The radiation beam reflected from the record carrier is incident on two detectors of the device are arranged in the far field of the information layer. The phase difference between output signals of the detectors is used to form a focus error signal. This focus error signal is used for controlling the axial position of the objective lens. A disadvantage of the known device is that of the focus error signal depends on the type of record carrier.

The phrase "the detectors are arranged in the far field of the information layer" is to be understood to mean that these detectors are located in a plane where the various diffraction orders of the beam from the information layer are sufficiently separated, i.e. in a plane which is disposed sufficiently far from the image of the information layer formed by the objective lens.

It is an object of the invention to provide a device for scanning a surface, which forms an accurate measure of the focus error, independent of the type of record carrier.

This object is met by a device as described in the preamble, which device is characterized according to the invention in that the electronic circuit is arranged for determining a time or phase difference between corresponding parts of the detector signals relating to passage of the radiation beam over patterns of the marks having a spatial frequency in a first range and in a different, non-overlapping second range, and forming the focus error signal in dependence on the time or phase difference. When the focus error signal is derived from the difference of two measurements, one in each range, the signal will be less affected by differences between different types of record carrier.

The marks used for measuring the time or phase difference are divided into two groups, one group preferably having a spatial frequency in a range from 0.14 to 0.2 times the cut-off frequency of the objective system, the other group in a range from 0.35 to 0.5 times the cut-off frequency. The focus error signal derived from these groups is relatively insensitive to the shape, size and phase depth of the marks, making the focus error signal independent of the type of record carrier.

The invention further relates to a method for determining the focus error from a time or phase difference measurement.

The invention also relates to a record carrier having the above patterns of marks located at specified parts of the tracks.

BRIEF DESCRIPTION OF THE DRAWING FIGURES

Figure 2A:
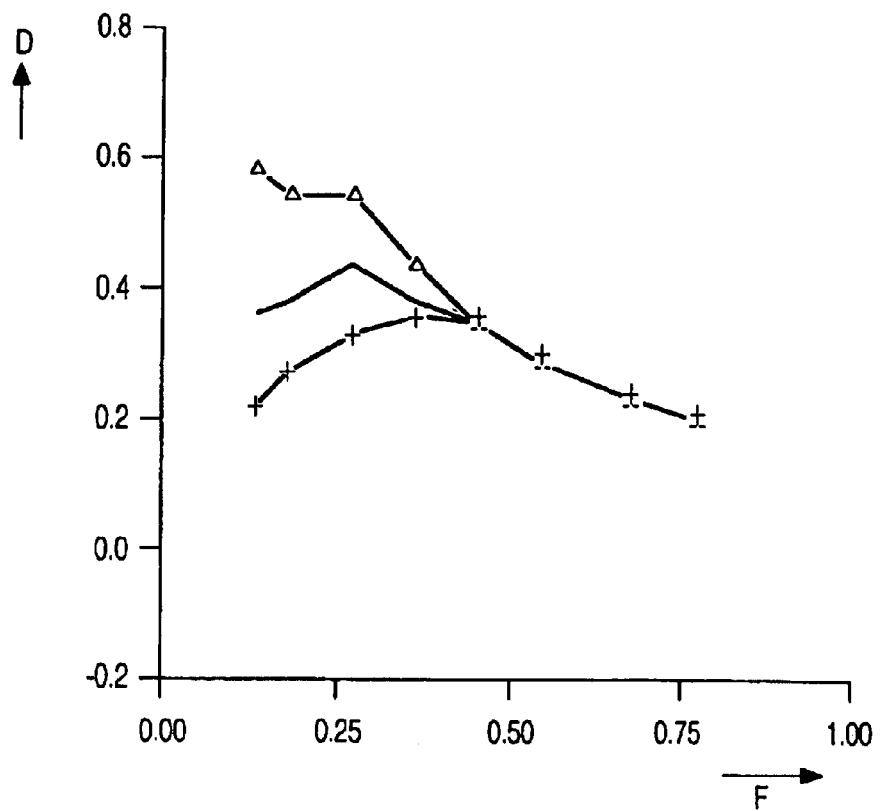
Figure 3:
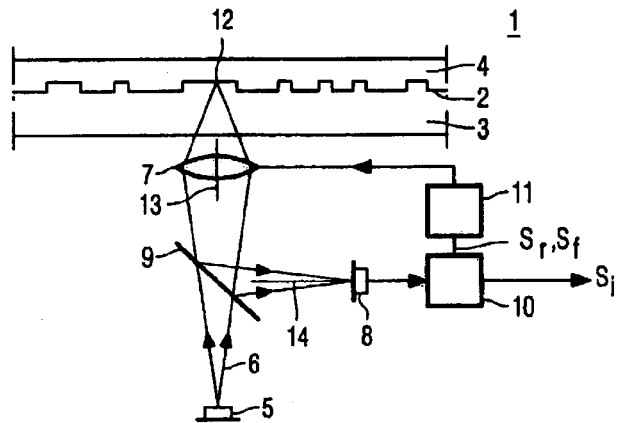
Figure 4:
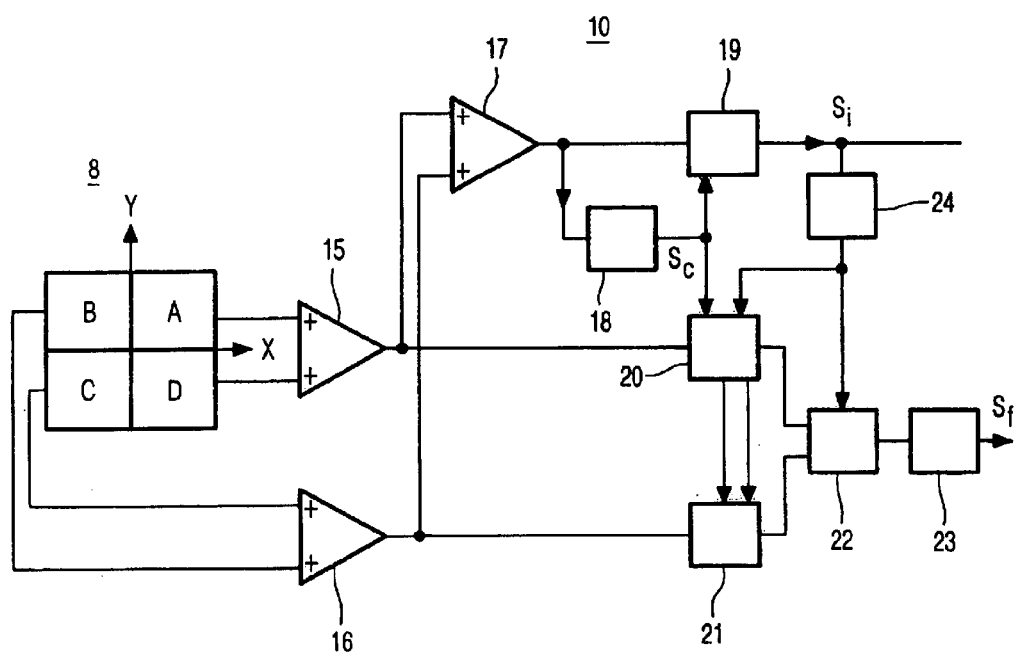
Figure 5A:
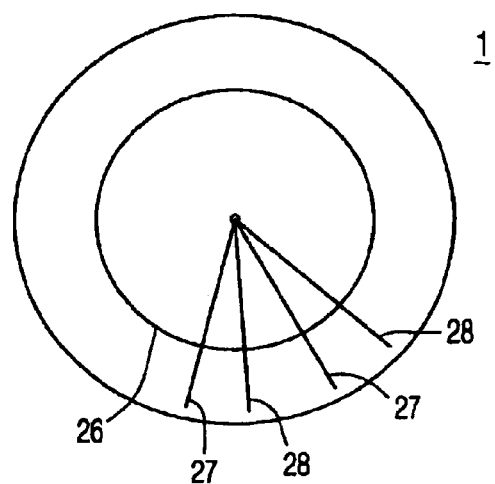
Figure 5B:
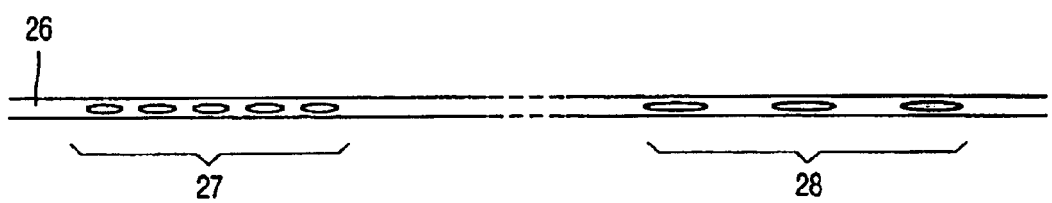

The invention will now be described by way of example and with reference to the accompanying drawings, in which FIG. 1 shows the far field pattern generated by a surface having a regular array of marks, FIGS. 2A, B and C show delays for three types of optical record carrier, FIG. 3 shows a device for scanning a surface according to the invention, FIG. 4 shows a circuit for forming a focus error signal, and FIGS. 5A and 5B show a record carrier according to the invention.

DETAILED DESCRIPTION.

The principle of the measurement will be explained with reference to FIG. 1. The Figure shows the far field pattern of a surface on which a regular array of marks is arranged, scanned with a focused radiation beam along a scan line. The diffracted orders of the beam coming from the surface are indicated by circles with thin lines, whereas the not-diffracted zeroth-order beam is indicated by a circle with a bold line. The numbers in brackets indicate the diffraction order in the X- and Y-direction. The centres of the diffracted orders are offset by a distance $\pm X_0$ and $\pm Y_0$ in the X- and Y-direction respectively, where $X_0=\lambda/(pNA)$ and $Y_0=\lambda/(qNA)$; NA is the numerical aperture of the radiation beam with a wavelength $\lambda$. The period of the marks in the scan direction is p, the spacing between scan lines is q. The detection region corresponds to the inner part of the zeroth order. The detector has four quadrants, denoted in the Figure by A, B, C and D. The scan direction is parallel to the X-axis, the transverse direction is parallel to the Y-direction.

The overlapping regions between the zeroth and first orders (0,0) and (+1,0) yields an important part of the high-frequency signal with frequency $\nu$, representing the marks on the surface. The phase of the signal is determined by the value $\psi$, the phase difference between the zeroth order and the first order. In the presence of defocusing, the phase of the high-frequency signal is still $\psi$ on the vertical dotted line in the overlap region, i.e. where $Y=\frac{1}{2}Y_0$. But in a cross-section of the overlap region parallel to the X-axis, the phase shows a linear variation in the presence of defocusing; the slope of the phase variation depends on the sign and the magnitude of the defocus. In the situation of FIG. 1, the signal from the detector A+D originates from the full overlapping region; the average phase of this signal will still be equal to A. However, as soon as the frequency is lower than half the cut-off frequency of the optical system used for scanning the surface, the detector A+D also detects part of the signal coming from the overlap region between the orders (0,0) and (−1,0). The addition of this extra signal at the frequency $\nu$ leads to a phase distortion, and the effective phase of the high-frequency signal will start to deviate from its reference value $\psi$. For marks in the form of pits of moderate depth and for pure amplitude marks, the phase difference increases when the focal point of the radiation beam is positioned beyond the surface as observed from the objective system focusing the radiation beam. The phase difference between the signals of detector A+D and detector B+C can also be expressed as a time difference between corresponding parts of the detector signals relating to passage of the radiation beam over one of the marks on the surface.

Figure 2B:
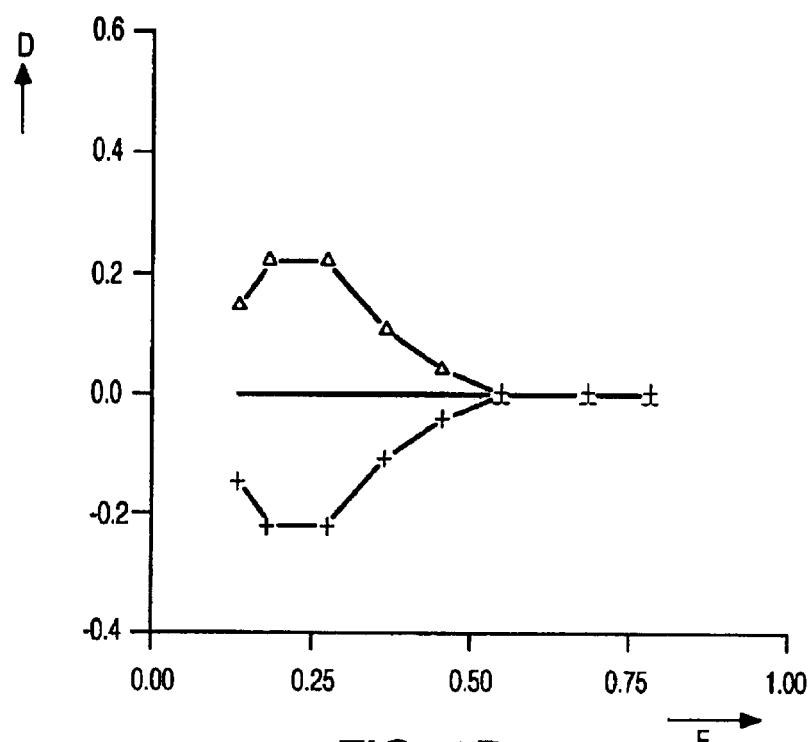
Figure 2C:
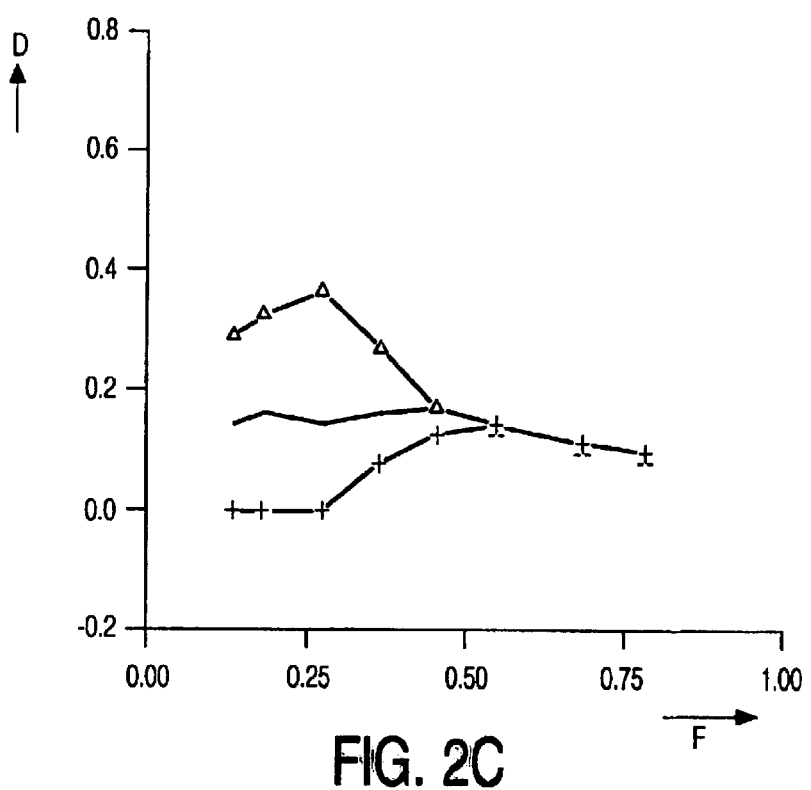

FIGS. 2A, B and C show the time difference in the form of a delay D between the detectors A+D and B+C for three types of optical record carriers. If the time difference is multiplied by the scanning speed of the radiation beam with respect to the information layer, the delay D is obtained, measured as a length difference on the information layer. The horizontal axis gives the spatial frequency F of the marks in the information layer of the record carrier, normalized on the theoretical cut-off frequency $2NA/\lambda$. The vertical axis gives the delay expressed in units of $\lambda/NA$. The triangles are delays determined at a defocus of +1 focal depth, i.e. of $\lambda/(2NA^2)$, the drawn line at an in-focus position and the crosses at a defocus of −1 focal depth. FIG. 2A shows the delay for record carrier of the so-called DVD-ROM type, having marks in the form of pits. FIG. 2B shows the delays for a record carrier of the DVD type having marks with only an amplitude effect. FIG. 2C shows the delay for a record carrier of the so-called DVD-RAM type, in which marks having both an amplitude and a phase effect are written in grooves of the information layer and on lands in between the grooves. From the Figures it is clear that a measurement of the delay for two different spatial frequencies yields information on the sign and magnitude of the defocusing. For the various types of record carrier the comparison of the delay should be done at a frequency of approximately 15% and 40% of the cut-off frequency. The criterion for optimum focus is now an equal delay at these specific spatial frequencies. These frequencies are either specifically implemented on the record carrier of they are selected from the broad spectrum which is already present in the modulated high-frequency signal from the record carrier. The sensitivity of the method for determining the focus error is given by the fact that a defocus of one focal depth results in a delay of about 0.14 $\lambda/NA$. For record carriers of the CD and DVD type this delay corresponds to about one clock period of the digital signal represented by the marks in the record carrier. Hence, a determination of time differences allows an accurate setting of the focal point within one focal depth.

FIG. 3 shows a device according to the invention in the form of an optical player for scanning a record carrier 1. The record carrier comprises an information layer 2 having an optically readable information structure in which information can be stored in a track-wise arranged series of mars. A mark may have any form having an optical contrast with its surroundings. It may be a pit or bump, as shown in the Figure, or an area with a different, possibly complex refractive index such as formed by the so-called phase-change writable materials. The information layer is arranged on a transparent substrate 3, through which the information layer is scanned. The other side of the information layer is covered with a protective layer 4. The record carrier may comprise more than one information layer, arranged one above the other. In an alternative embodiment of the record carrier transparent substrate 3 is replaced by a thin transparent cover layer, having a thickness in the range from 10 nm to 100 μm, or is absent altogether, and the support function for the record carrier is taken over by protective layer 4.

The device comprises a radiation source 5, emitting a radiation beam 6. The radiation beam is focused to a focal spot 12 on information layer 2 by an objective system 7, shown in the Figure as a single lens. The objective system may comprise more than one lens, or a collimating lens and an objective lens. Radiation reflected by the information layer is directed towards a detection system 8 via a beam splitter 9. The beam splitter may be a semi-transparent plate or a diffraction gating and may be polarization-sensitive. The detection system converts the incident radiation into one or more electric signals, which are fed into an electronic circuit 10, which derives therefrom an information signal $S_i$, representing information read from the record carrier, and control signals. One of the control signals is a radial tracking error signal $S_r$, representing the distance between the centre of focal spot 12 and the scan line, i.e. the centre-line of the track on the record carrier being scanned. Another control signal is a focus error signal $S_f$, representing the distance between the focal point of the radiation beam and the information layer. The two error signals are fed into a servo circuit 11, which controls the position of the focal point of the radiation beam. In the Figure the focus control is realized by moving objective system 7 along its optical axis in response to the focus error signal, whereas the radial tracking is realized by moving the objective system in a direction transverse to the tracks and the optical axis in response to the radial tracking error.

FIG. 4 shows the radiation-sensitive detection system 8 and part of the electronic circuit 10. Detection system 8 comprises four detectors A, B, C and D with the X-and Y axis as dividing lines between the detectors. The effective track direction corresponds to the horizontal direction X in the Figure. The effective track direction is the direction of the track currently being scanned on the record carrier as seen on the detection system through the optics between the detection system and the information layer comprising the track. The optical axis 13 of objective system 7 passes through the centre of detection system 8 when the objective system and the detection system are at their nominal positions. The spot of the radiation beam from the record carrier is then also centred on the detection system. The axis 14 of the radiation beam incident on the detection system thus substantially intersects both dividing lines X and Y. The detection system is arranged in the far field of the information layer.

The part of electronic circuit 10 shown in FIG. 4 forms a focus error signal from the four output signals of detectors A, B, C and D. The output signals of detectors A and D are added in an adder 15; likewise, an adder 16 adds the output signals of detectors B and C. An adder 17 adds the output signals of adders 15 and 16, giving an output signal representing the total radiation intensity incident on detection system 8, and thereby the information stored in the marks of the record carrier. A clock extractor 18, in the form of a phase-locked loop, derives a clock signal $S_c$ from the output signal of adder 17. The clock signal is used in a circuit 19, which forms the high-frequency or binary information signal $S_i$ from the output signal of adder 17. Clock signal $S_c$ is fed into timing units 20 and 21. Timing unit 20 determines the time difference between a leading edge of a mark in the signal from detectors A and D and the corresponding edge of the clock signal. Likewise, timing unit 21 determines the time difference between a leading edge of the same mark in the signal from detectors B and C and the same edge of the clock signal. A circuit 22 forms the difference of the two time differences output by timing units 20 and 21.

Circuit 10 may select patterns having periods of approximately $\lambda/NA$ and $3\lambda/NA$ from the spectrum of patterns obtained when reading information from the record carrier and use these patterns for the determination of the focus error signal. However, in a preferred embodiment of the optical player the electronic circuit comprises a circuit 24, that establishes an enabling signal for timing units 20 and 21 from information signal $S_i$. The record carrier for this player comprises, at specified locations, two patterns of marks at two different spatial frequencies. Circuit 24 sends an enabling signal to timer units 20 and 21 when the radiation beam is at the specified locations. Circuit 22 forms two difference of the outputs of timing units 20 and 21, one for each of the two patterns. A focus error signal at an output of circuit 22 is the difference signal of said two differences. This focus error signal is relatively independent of the type of the record carrier. Circuit 22 may be followed by a low-pass filter to remove the high-frequency components from the output signal before it is fed into servo circuit 11. It will be clear that the focus error signal may also be formed by determining the time difference between the outputs of adders 15 and 16 directly, or by determining the time differences between each of the four outputs of detectors A, B, C and D with clock signal $S_c$ and subsequently adding the time differences of detectors A and D and subtracting those of detectors B and C.

It will be understood that, instead of through the determination of time differences or delays, the focus error signal may also be obtained through the measurement of phase differences between the detector signals and the clock signal.

FIG. 5A shows a top view of a record carrier according to the invention. The tracks along which the device scans the information are circular or spiral. Only one track 26 is shown in the Figure. FIG. 5B shows an enlargement of part of track 26. At fixed angular positions 27 each track comprises a pattern of marks having a spatial frequency in the range from 0.35 to 0.5 times the cut-off frequency of the objective system. At other locations 28 each track comprises a pattern of marks having a spatial frequency in the range from 0.14 to 0.2 times the cut-off frequency. The patterns preferably have a period of $3\lambda/NA$ and $1\lambda/NA$. These positions are sensed by circuit 24 shown in FIG. 10 and, subsequently, the patterns at these positions are used to derive a value of the focus error signal. To reduce the effects of cross-talk between neighbouring tracks on the determination of the focus error signal, the patterns in neighbouring tracks are preferably in phase. The patterns may form part of headers in which address information is stored. The patterns may form so-called VFO fields, i.e. fields used for generating a periodic signal to lock an oscillator to.

Since the capture range of the focus servo using the above focus error signal is relatively small, the device should preferably derive a focus error signal from the low-frequency components of the detector signals, which has a substantially larger capture range. When the focal spot is at a large distance from the information layer, the low-frequency-derived focus error signal is used, and close to the information layer, servo circuit 11 gradually switches over to the high-frequency derived focus error signal. European patent application No. 812 457 describes several ways to derive a focus error signal from the low-frequency components of the detector signals and implementations of the gradual switch-over.

The radial tracking error signal $S_r$ may be derived in known ways. Preferred methods are the push-pull method, known from inter alia U.S. Pat. No. 4,057,833, and the differential time detection method, disclosed in U.S. Pat. No. 4,785,441.

What is claimed is:

1. An optical record carrier for being scanned by an optical system having a predetermined spatial cut-off frequency and having an information layer in which information is stored in optically readable marks arranged in tracks, wherein at predetermined parts along the tracks a first pattern of marks and a second pattern of marks are located, the first pattern having a spatial frequency in a range from 0.14 to 0.2 times the cut-off frequency and the second pattern having a spatial frequency in a range from 0.35 to 0.5 times the cut-off frequency.

2. A method for scanning an optical record carrier comprising optically detectable marks along a track, the method comprising:

a radiation source for emitting a radiation beam, an objective system which guides the radiation beam to the record carrier, and a radiation-sensitive detection system which receives radiation from the record carrier, the detection system comprising at least two detectors on both sides of a dividing line, each detector having an output for providing a detector signal, and an electronic circuit which forms a focus error signal from the detector signals, wherein the electronic circuit is arranged to determine a time or a phase difference between corresponding parts of the detector signals relating to passage of the radiation beam over patterns of the marks having a spatial frequency in a first range from 0.14 to 0.2 times the cut-off frequency of the objective system and in a different, second range from 0.35 to 0.5 times the out-off frequency of the objective system, and a focus error signal is formed in dependence on the time or phase difference.

3. A method for scanning an optical record carrier comprising optically detectable marks along a track, the method comprising:

guiding a radiation beam to the record carrier, and receiving radiation from the record carrier with a radiation-sensitive detection system, the detection system comprising at least two detectors on both sides of a dividing line, each detector having an output for providing a detector signal, wherein a time or phase difference is determined between corresponding parts of the detector signals relating to passage of the radiation beam over patterns of the marks having a spatial frequency in a first range from 0.14 to 0.2 times the cut-off frequency of the objective system and in a different, second range from 0.35 to 0.5 times the cut-off frequency of the objective system, and a focus error signal Is formed in dependence on the time or phase difference.

* * * * *